Patented Mar. 13, 1934

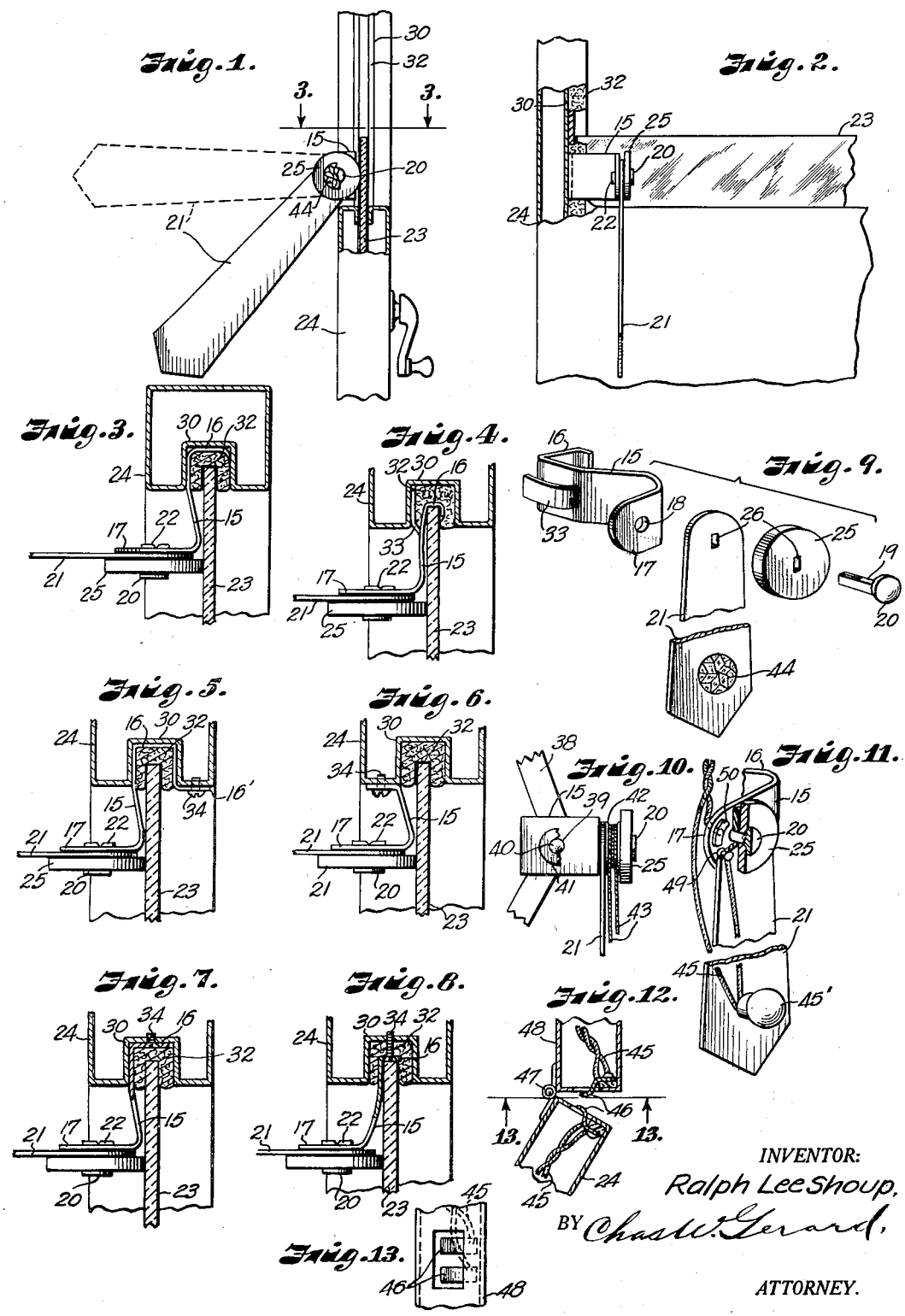

1,951,172

UNITED STATES PATENT OFFICE 1,951,172

VEHICLE SIGNAL

Ralph Lee Shoup, Independence, Mo.

Application September 6, 1932, Serial No. 631,804

4 Claims. (Cl. 116—52)

The present invention relates to vehicle signal devices, and has particular reference to the form of semaphore signal which is mounted in display position at one side of a vehicle, such as an automobile, and is adapted to be suitably actuated for moving its signal arm or semaphore into or out of signalling position, at the will of the driver of the vehicle.

Accordingly the present invention seeks to provide an improved method and means for the mounting of such signal arm or semaphore for convenient operation at the side of the vehicle, preferably by attachment to the door of the vehicle, for which purpose the device includes a holding means having provision for engagement either with the margin of the door or window glass opening or by projection within the guide channel for the window glass, at either side of the felt strip forming the cushion for said glass. In this connection the invention is particularly designed for the type of semaphore or signal arm having provision for effecting the signalling movements by frictional engagement with the window glass or other reciprocating means, for producing the required movement of the signal.

It is further sought to provide a device having a suitable illuminating element, if desired, as well as a neat, simple and attractive construction, which will be of an economical nature to manufacture at a minimum of expense, and having parts which may be renewed or interchanged if desired.

With the above general objects in view, as well as minor objects as will appear in the course of the detailed specification, the invention will now be described with reference to the accompanying drawing illustrating practical forms of embodiment of the improvements, after which those features and combinations deemed to be novel will be particularly set forth and claimed.

In the drawing—

Figure 1 is a sectional elevation, illustrating a portion of an automobile door and framework, equipped with a device constructed in accordance with my invention;

Figure 2 is a similar view, at right angles to the plane of Figure 1;

Figure 3 is a horizontal sectional view, on a larger scale, representing a section taken on the line 3—3 of Figure 1;

Figures 4, 5, 6, 7 and 8 are similar horizontal sectional views, representing modified forms of the construction;

Figure 9 is a perspective view of the parts comprising the device, in separated relation, the signal arm being shown partly broken away;

Figure 10 is a still further modified detail of the construction, illustrating its adaptation to the windshield bracket of an open car;

Figure 11 is a fragmentary perspective view, illustrating the signal arm as provided with a lamp bulb and circuit connections;

Figure 12 is a horizontal detail sectional view, showing the door switch for said circuit connections; and Figure 13 is a detail section, representing a section on the line 13—13 of Figure 12.

Referring now to the drawing in detail, this illustrates the improved device as comprising a holder or bracket member 15 which may be of any suitable relatively stiff material, such as sheet metal, aluminium or other moderately light and yet comparatively stiff material, adapted to be formed into the shape of a bracket of any desired dimensions, as illustrated in Figures 3 and 9, having the laterally bent portion 16 at one end for attachment to the vehicle, and also the lateral lug 17 at its other end, punched with a suitable opening 18 for engagement by a fastener 19 having the head 20. This fastener is for securing and pivotally mounting the semaphore or signal arm 21 designed to be made of any suitable, relatively stiff material, such as celluloid, cardboard, or a metal such as aluminium, the semaphore to be finished, and colored or otherwise ornamented, as desired. The signal arm or semaphore 21 is designed to be actuated by the movements of the sliding window glass 23 of the car door 24, in the manner illustrated and explained in my Patent Number 1,757,816, dated May 6, 1930. For this purpose, a friction disk 25 is provided to be also engaged by the shank of the fastener 19, which is fitted to angular or slot openings 26 in the arm 21 and disk 25 before the fastener is secured within the opening 18, as by upsetting or spreading of the split terminal of the fastener, as illustrated at 22 in Figures 3 to 8.

Referring now to Figures 3 to 8, these views illustrate different methods of mounting the device in operative relation to the sliding window glass 23 of the car door 24. In Figure 3, the laterally bent portion 16 of the bracket or holder 15 is inserted within the window guide channel 30 of the door, in such a manner as to embrace the guide strip 32 for the window glass. This enables the device to be mounted at any height which may be preferred, within the limits of the vertical extent of the window opening.

In Figure 4, the angular portion 16 of the holder is bent so as to embrace the edge of the window glass 23, while in addition a prong 33 is struck out of the body of the holder (see also Figure 9) for engagement with the adjacent side of the door channel 30 or between it and the guide strip 32. In Figure 5, the angular portion 16 of the holder is made sufficiently long to extend entirely around the door channel 30 and formed with an extension 16' which is anchored to the door frame by means of a screw 34, for which a suitable opening is drilled into the door frame. In Figures 6 to 8 the attachment is also made by means of a screw 34, in Figure 6 the attachment being at the margin of the door channel, without any projection of the holder within said channel; Figure 7 shows the holder attached by means of a screw 34 at the base of the door channel 30, while in Figure 8 the arrangement is similar, with the exception that the holder terminal 16 is inserted within the groove of the guide strip, and the attachment made by driving the screw through said guide strip into the base of the channel 30.

In Figure 10 is illustrated a mode of attaching the device to the windshield frame or bracket 38 of an open car, for which purpose a suitable opening 39 is provided in the holder 15 for mounting it upon the bolt or screw 40, whereupon the device is firmly clamped in place by replacing the windshield clamp-nut 41 (shown partly broken away). For operating the signal when the device is thus mounted, a wheel or pulley element 42 may be interposed between the disk 25 and signal arm 21, and equipped with a suitable operating cord 43, whereby the arm may be actuated in either direction, for signaling purposes.

Reflector buttons 44 may be attached to the signal arm at any desired points, as indicated in Figure 9, or if preferred to the head 20 of the fastener 19, as indicated (partly broken away) in Figure 1.

In Figures 11–13 I illustrate the use of an electric bulb 45' and switch and wiring connections therefor, which bulb may be located at any desired point, either on the bracket or the arm itself as shown, and provided with wiring 45 for which circuit closing contacts 46 are provided at the hinge joint 47 between the door and car frame 48 (Figures 12—13). At the pivoted end of the arm 21, the same is provided with a slide or brush contact construction, comprising a contact element 49 carried by the arm 21, and adapted for engagement, during certain positions of said arm—as in the raised or signaling position, with a contact plate 50 carried by the adjacent portion of the holder 15, as shown in Figure 11.

It will thus be apparent that I have provided a simple and efficient construction, which may be attached to or removed from the car in a few seconds, and attached in any of the various ways described, and illustrated in Figures 1 to 10; it is moreover apparent that the holder may be attached at any height desired at the side of the window, and also that it may be applied at either the front or back edge of the window opening.

In any of the methods used and illustrated in Figures 1 to 8, it is also evident that the operation of the signal is effected by a slight movement of the window glass 23, all as set forth in my aforesaid patent. Where the device is used in connection with an open car, its mounting as illustrated in Figure 10 permits manual operation of the device, in a convenient and effective manner, by pulling on either of the loose cord ends 43, for raising or lowering the signal arm. The construction of the device comprising so few parts, held together by means of a single fastening 19, permits ready assembly as well as the separation of the parts, as may be desired for repair purposes, or for substitution of a longer signal arm or one of a different material or finish, to suit the preferences of the owner.

While the foregoing illustrates various practical methods of practicing the invention, and suitable forms for its embodiment, I desire to be understood as reserving the right to make whatever changes or modifications may fairly fall within the spirit and scope of the appended claims.

Having thus described my invention, what I claim to be new and desire to secure by Letters-Patent is:

1. Signaling means for vehicles having window openings fitted with sliding window glasses, comprising a signal arm, a holder provided with means for pivotally mounting said arm, means forming a part of said holder for adjustable retaining engagement at different heights along the side of the window opening, and means operating by frictional engagement with the window glass for imparting signalling movements to said arm.

2. Signaling means for vehicles having window openings provided with guide channels fitted with sliding window glasses, comprising a signal arm, a holder forming a pivotal support for said arm, means forming a part of said holder and engageable within one of said guide channels for attaching the latter in supporting position, and means operating by frictional engagement with the window glass for imparting signaling movements to said arm.

3. Signaling means for vehicles having window openings provided with guide channels fitted with sliding window glasses, comprising a signal arm, means operating by engagement within one of said guide channels for supporting the arm in operative position, and means operating by frictional engagement with the window glass for imparting signalling movements to said arm.

4. Signaling means for vehicles having window openings fitted with sliding window glasses, comprising a signal arm, a holder having means for retaining engagement with but one of the vertical sides of the window opening, a fastener securing said arm in pivotal relation to said holder, and a frictional disk keyed to said fastener in position for actuation by movement of the window glass for operating said signal arm.

RALPH LEE SHOUP.